United States Patent
Weyer et al.

(10) Patent No.: US 11,173,742 B2
(45) Date of Patent: Nov. 16, 2021

(54) CLEAR HUBCAPS WITH OIL RANGE MARKINGS

(71) Applicant: CNH Industrial America LLC, New Holland, PA (US)

(72) Inventors: Jason Weyer, Fargo, ND (US); Nathan J. Carlson, West Fargo, ND (US); Brian D. Vik, Barnesville, MN (US); Jason K. Novacek, West Fargo, ND (US); Daniel J. Klein, Mequon, WI (US); Thomas M. Curley, Fargo, ND (US); Anna J. Reisenauer, West Fargo, ND (US)

(73) Assignee: CNH Industrial America LLC, New Holland, PA (US)

(*) Notice: Subject to any disclaimer, the term of this patent is extended or adjusted under 35 U.S.C. 154(b) by 425 days.

(21) Appl. No.: 15/997,134

(22) Filed: Jun. 4, 2018

(65) Prior Publication Data
US 2019/0367108 A1   Dec. 5, 2019

(51) Int. Cl.
   *B60B 7/00*    (2006.01)
   *B62D 55/092*  (2006.01)
   *B60B 19/08*   (2006.01)

(52) U.S. Cl.
   CPC ............ *B60B 7/0013* (2013.01); *B60B 7/002* (2013.01); *B60B 19/08* (2013.01); *B62D 55/092* (2013.01); *B60B 2900/531* (2013.01); *B60B 2900/561* (2013.01)

(58) Field of Classification Search
   CPC ....... B60B 7/0013; B60B 7/002; B60B 7/006; B62D 55/092
   See application file for complete search history.

(56) References Cited

U.S. PATENT DOCUMENTS

| | | | | |
|---|---|---|---|---|
| D80,711 S | * | 3/1930 | Toncray | D12/204 |
| 2,854,287 A | * | 9/1958 | Stephens | B60B 27/02 301/108.2 |
| 3,064,982 A | * | 11/1962 | Stephens | F16J 15/3232 277/402 |
| 5,024,488 A | * | 6/1991 | Lindhuber | B60B 7/0013 301/108.4 |
| 5,066,071 A | * | 11/1991 | Kinser | B60B 7/002 210/222 |
| 6,273,519 B1 | * | 8/2001 | Tsou | B60B 7/002 301/108.2 |
| 6,447,072 B1 | * | 9/2002 | Johnson | F16C 33/664 301/108.2 |
| 6,485,110 B1 | * | 11/2002 | Lasko | F16N 19/003 180/9.1 |
| D671,056 S | * | 11/2012 | Burki | D12/204 |
| 8,979,215 B2 | * | 3/2015 | Kile | B60B 7/002 301/108.2 |
| 2012/0187751 A1 | * | 7/2012 | Kile | B62D 55/092 305/119 |
| 2014/0152081 A1 | * | 6/2014 | Leung | B60B 7/0013 301/108.2 |

\* cited by examiner

*Primary Examiner* — Jason R Bellinger
(74) *Attorney, Agent, or Firm* — Rickard K. DeMille; Rebecca L. Henkel

(57) ABSTRACT

A vehicle including at least one wheel and at least one hub assembly associated with the at least one wheel. The at least one hub assembly includes a hubcap. The hubcap has a transparent body configured for housing a lubricant, a fill port, and at least one continuous indication feature such that a lubricant volume is indicated in any orientation of the hubcap.

12 Claims, 4 Drawing Sheets

CLEAR HUBCAPS WITH OIL RANGE MARKINGS

FIELD OF THE INVENTION

The present invention pertains to vehicles and, more specifically, to work vehicles having clear hubcaps.

BACKGROUND OF THE INVENTION

Some work vehicles, including tracked work vehicles, may have a hub assembly which includes oiled hubcaps with lubrication oil applied internally within the hub of the wheel or roller and the spindle of the axle. Thereby, the oil is internally contained. It is known to provide transparent hubcaps to allow an operator to easily visually inspect the amount of oil within a respective hub assembly. Additionally, an oil fill port can be incorporated into the front face of the transparent hubcap. Typically, in order to accurately determine if the oil level is correct, an operator must align the fill port to be in the 12 o'clock position. An operator may have to expend a considerable amount of time and energy moving the vehicle forwardly or rearwardly in order to position each wheel or roller in its respective 12 o'clock position to then accurately determine the oil level of each hubcap. An operator may attempt to save time by estimating the oil level in a particular hubcap by comparing the oil levels of adjacent hubcaps to the oil level of the particular hubcap at issue. if the oil levels of the adjacent hubcaps are relatively similar to the oil level of the particular hubcap at issue, the operator may assume that the oil levels are at the correct level. However, this process of approximating the oil levels in the hubcaps can yield inaccurate estimations and lead to seal and/or bearing failure.

What is needed in the art is a clear hubcap that efficiently indicates the oil level within the hubcap at any orientation.

SUMMARY OF THE INVENTION

In one exemplary embodiment formed in accordance with the present invention, there is provided a hub assembly for a work vehicle, such as a tracked tractor, which includes a transparent hubcap with two concentric indication scribe lines for easily and efficiently determining the lubricant volume range in any orientation of the hubcap. The body of the transparent hubcap is a pyramidal frustum which includes a flat top upon which the maximum lubricant fill line is positioned and a circular indentation upon which the minimum lubricant fill line is positioned.

In another exemplary embodiment formed in accordance with the present invention, there is provided a vehicle including at least one wheel and at least one hub assembly associated with the at least one wheel. The at least one hub assembly includes a hubcap. The hubcap has a transparent body configured for housing a lubricant, a fill port, and at least one continuous indication feature such that a lubricant volume is indicated in any orientation of the hubcap.

In yet another exemplary embodiment formed in accordance with the present invention, there is provided a hub assembly for a wheel of a vehicle including a hubcap having a transparent body configured for housing a lubricant, a fill port, and at least one continuous indication feature such that a lubricant volume is indicated in any orientation of the hubcap.

One possible advantage of the exemplary embodiment of the hub assembly is that an operator can easily and efficiently determine the lubricant volume of the hubcap in any orientation of the hubcap.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

Figure 1:
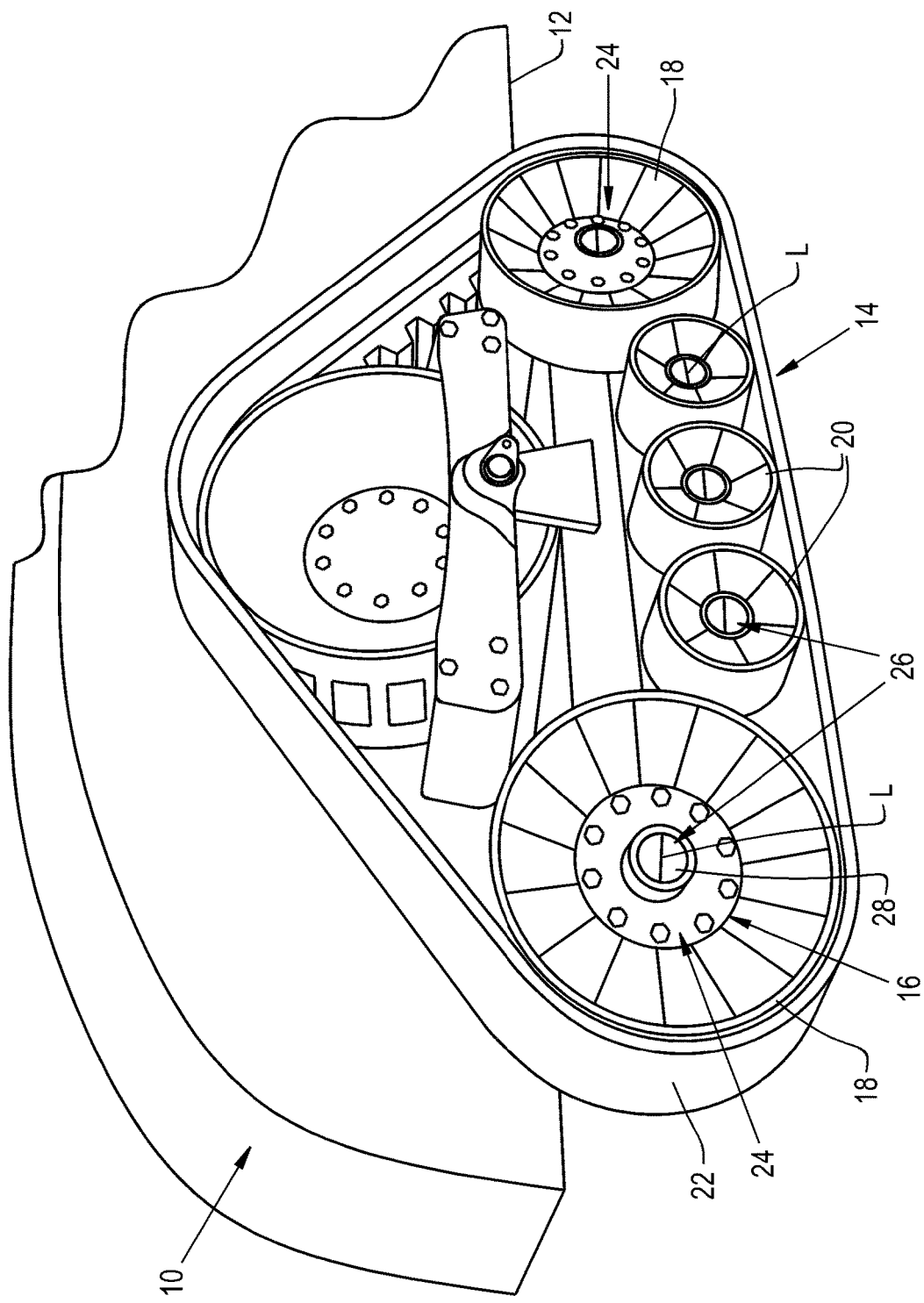
FIG. 1 illustrates a perspective view of a known tractor with transparent hubcaps.

Referring now to FIG. 1, there is shown a known tracked tractor 10 which generally includes a chassis 12, at least one track assembly 14, and at least one hub assembly 16. Each track assembly 14 may include roller wheels 18, idler wheels 20, and a track 22, e.g. an endless rubber belt, that is coupled to and rotates around the wheels 18, 20 in a known manner. Each wheel 18, 20 may include a respective axle to which it is operably attached (not shown). Each hub assembly 16 may include a hub 24 and a transparent, i.e., clear hubcap 26 that is configured for housing a lubricant L, such as oil, in between the respective axle and the hub 24. Each transparent hubcap 26 may include a fill port 28 in order to replenish the hub 24 with additional lubricant. The transparent hubcaps 26 allow an operator to see the volume of oil within each hub 24. However, due to the shape of the hubcaps 26 and the configuration of the fill ports 28, an operator must generally, individually align each fill port 28 in the 12 o'clock orientation in order to accurately determine the volume of lubricant within the hubcaps 26. As can be appreciated, aligning each fill port 28 in its 12 o'clock orientation may take a considerable amount of time in order to properly evaluate and fill each transparent hubcap 26.

Figure 2:
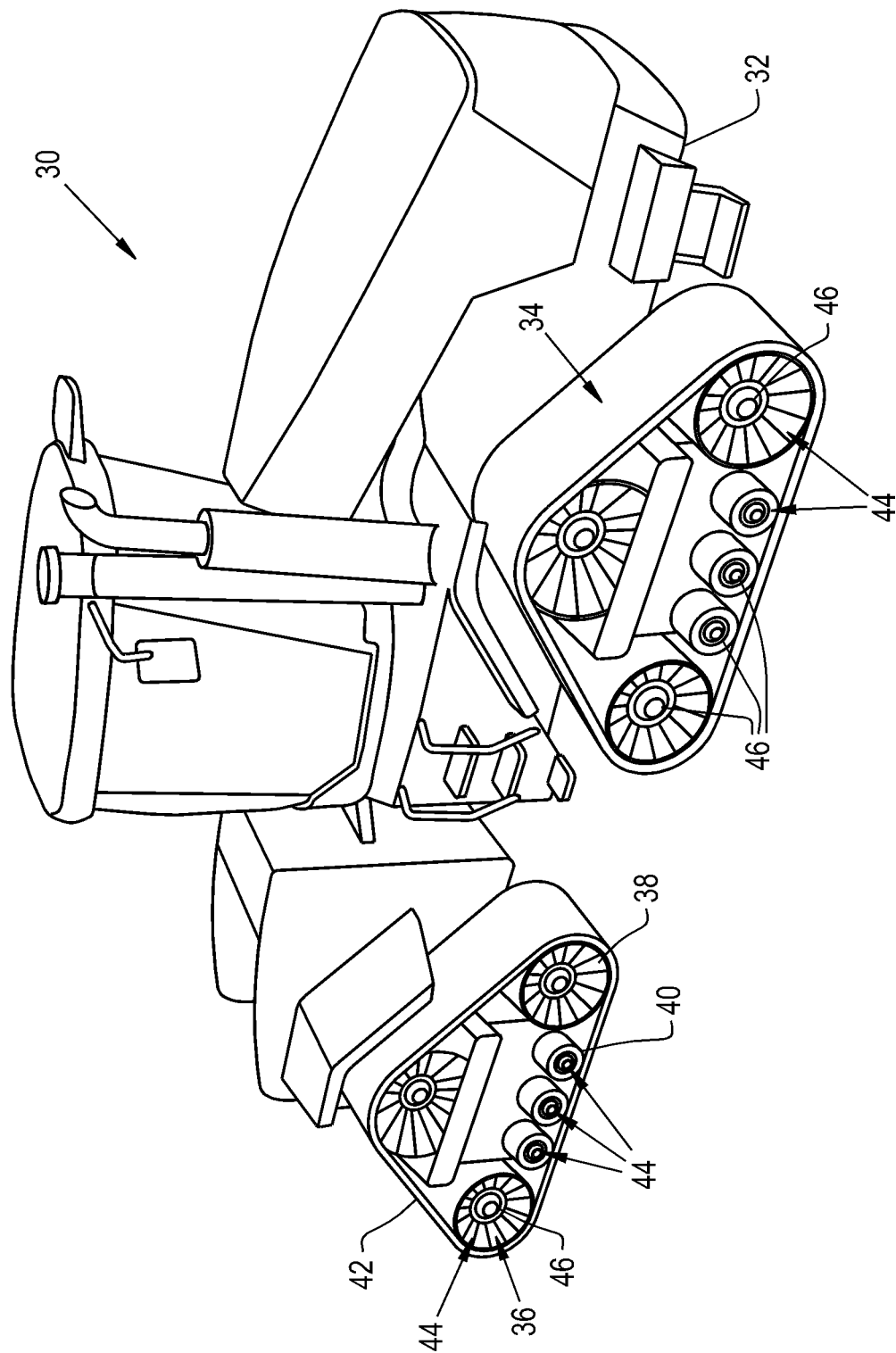
FIG. 2 illustrates a perspective view of an embodiment of a vehicle having transparent hubcaps with concentric indication lines, in accordance with an exemplary embodiment of the present invention.
Figure 3A:
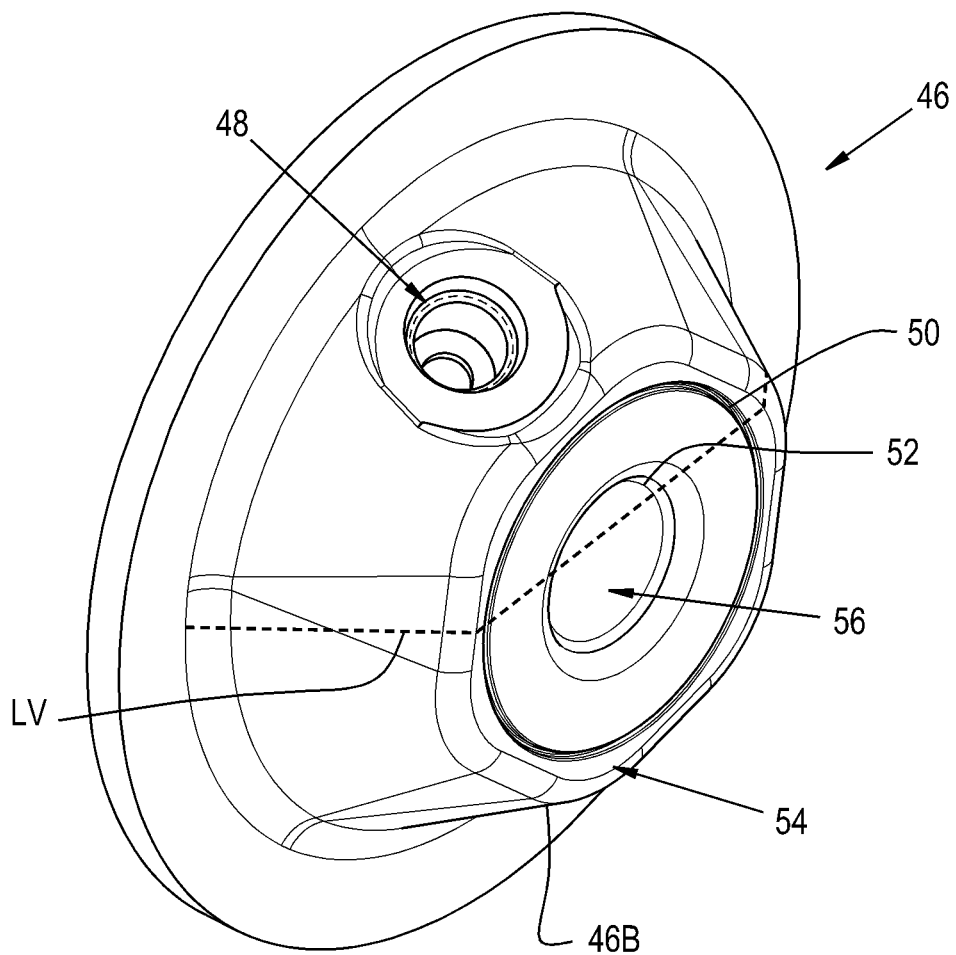
FIGS. 3A-3B illustrate the transparent hubcaps of the vehicle of FIG. 2, in accordance with an exemplary embodiment of the present invention.
Figure 3B:
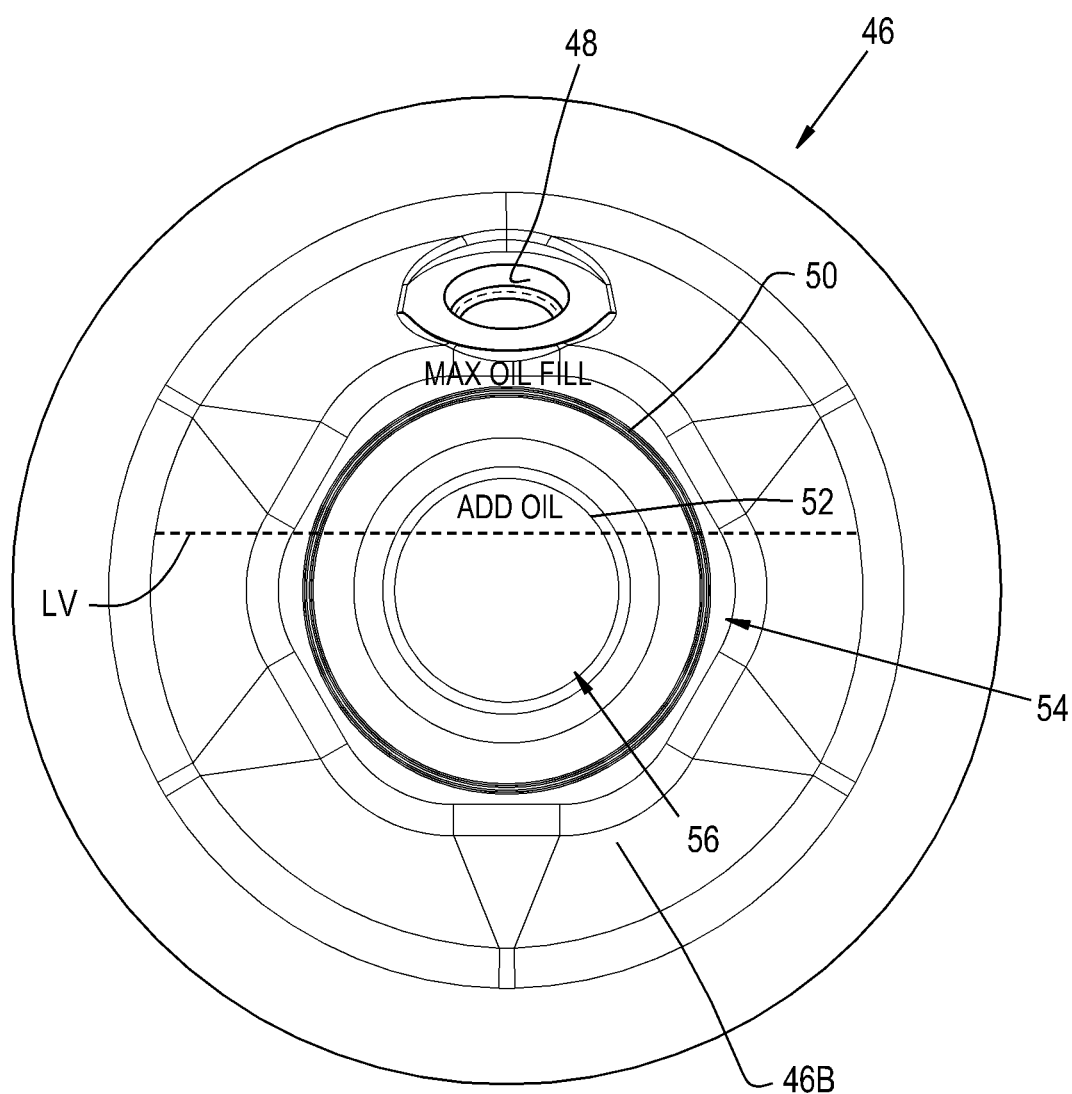

Referring now collectively to FIGS. 2, 3A, and 3B, there is shown a vehicle 30 according to the present invention. The vehicle 30 can be in the form of any desired work vehicle with wheels and/or tracks. For example, the vehicle 30 may be in the form of an agricultural tractor that has tracks for traversing a field. The vehicle 30 can be substantially similar to the vehicle 10 as described above, and thereby the vehicle may include a chassis 32, at least one track assembly 34, and at least one hub assembly 36 associated with each wheel 38, 40. The track assembly 34 may include at least one wheel, for example one or more roller and/or idler wheel(s) 38, 40, a track 42, and at least one axle associated with each wheel 38, 40. Each hub assembly 36, for each wheel 38, 40, may include a hub 44 and a transparent hubcap 46 configured for housing the lubricant.

Each transparent hubcap 46 has a transparent, i.e., clear, body 46B, a fill port 48, and one or more continuous indication feature(s) 50, 52 so that a lubricant volume LV can be readily indicated in any orientation of the hubcap 46

(FIGS. 3A-3B). The transparent body 46B can be in the form of a transparent pyramidal frustum 46B. More particularly, the transparent body 46B can be a six-sided transparent pyramidal frustum 46B with a filleted, substantially circular base. Alternatively, however, the transparent pyramidal frustum 46B could have more than six sides or less than six sides. It should be appreciated that the transparent body 46B may be in the form of a conical transparent body (not shown). The transparent pyramidal frustum 46B may include a flat top 54 and a circular indentation 56 disposed in the flat top 54.

The fill port 48 can be located on a side of the transparent pyramidal frustum 46. In this regard, the fill port 48 can be easily accessed by an operator. The fill port 48 may be threaded to accommodate a corresponding closure device, such as a plug or screw cap.

The one or more continuous indication feature(s) 50, 52 may be in the form of a first circular indication feature 50, indicating the maximum lubricant fill level, and a second circular indication feature 52, indicating the minimum lubricant fill level or add lubricant line, which is concentric with the first circular indication feature 50. The first circular indication feature 50 may have a larger diameter than the second circular indication feature 52. The maximum fill level indication feature 50 can be located on the flat top 54. The maximum fill level indication feature 50 may encircle the concentric circular indentation 56. The maximum fill level indication feature 50 may be defined by the outer perimeter of the flat top 54, which marks the transition between the sides of the hubcap and the flat top, such that the diameter of the maximum fill level indication feature 50 is one in the same with or positioned in close proximity to and inside of the outer filleted, shoulder of the flat top 54. For example, the maximum fill level indication feature 50 can be positioned within approximately one inch of the outer filleted, shoulder of the flat top 54. The maximum fill level indication feature 50 can also be positioned relative to the bottom or internal opening of the fill port 48, which sits within the hubcap 46. For instance, when the fill port 48 is oriented in the 12 o'clock position, the diameter of the maximum fill level indication feature 50 can approximately match, e.g. within an inch, the bottom or internal opening of the fill port 48. In this regard, in any orientation of the fill port 48, the maximum oil level can be quickly ascertained. The minimum fill level indication feature 52 can be located on the circular indentation 56. Further, the diameter of the circular indentation 56 may define the diameter of the minimum fill level indication feature 52.

Both of the indication features 50, 52 may be in the form of circular scribe lines 50, 52. These circular scribe lines 50, 52 may be molded into the hubcap 46 and can be extruded or inlayed from the face of the hubcap 46. Thereby, the circular scribe lines 50, 52 can be on the outer and/or inner surface of the hubcap 46. Alternatively, the indication features 50, 52 may be in the form of non-circular scribe lines, such as multi-sided scribe lines, for example, hexagonal, octagonal, etc. scribe lines. It should be appreciated that the hubcap 46 may only include the maximum fill level indication feature 50 or the minimum fill level indication feature 52.

Due to the flat top 54 and the circular indentation 56 of the pyramidal frustum body 46B, and the circular indication features 50, 52 being respectively positioned on the flat top 54 and the circular indentation 56, the lubricant volume LV can be readily obtained throughout any orientation of the hubcap 46. In other words, the shape of the pyramidal frustum 46B helps to highlight to the circular indication features 50, 52. An operator can easily determine if the top of lubricant volume LV resides at or within the diameter of the circular indentation 56, and thereby the diameter of the minimum lubricant level indication feature 52, which then signifies that additional lubricant should be added to the hubcap 46. Additionally, an operator can easily determine when the hubcap 46 has the maximum amount of lubricant because an operator can readily look to the where the flat top 54 begins and where the maximum lubricant fill level is positioned on the flat top 54. Therefore, in any orientation of the hubcap 46, the lubricant volume LV can be efficiently determined.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A vehicle, comprising:
   at least one wheel; and
   at least one hub assembly associated with said at least one wheel and including a hubcap, said hubcap having a transparent body configured for housing a lubricant, a fill port, and at least one continuous indication feature such that a lubricant volume is indicated in any orientation of the hubcap, wherein said at least one continuous indication feature is in the form of a first circular indication feature and a second circular indication feature that is concentric with the first circular indication feature,
   wherein the fill port has a bottom within the hubcap, and a diameter of the first circular indication feature corresponds to the bottom of the fill port, and
   wherein the transparent body is in the form of a transparent pyramidal frustum having a top and a circular indentation disposed in the top.

2. The vehicle of claim 1, wherein the transparent body is in the form of a six-sided transparent pyramidal frustum with a filleted, substantially circular base.

3. The vehicle of claim 1, wherein a side of the transparent pyramidal frustum includes the fill port.

4. A vehicle, comprising:
   at least one wheel; and
   at least one hub assembly associated with said at least one wheel and including a hubcap, said hubcap having a transparent body configured for housing a lubricant, a fill port, and at least one continuous indication feature such that a lubricant volume is indicated in any orientation of the hubcap, wherein the at least one continuous indication feature is in the form of a first circular indication feature and a second circular indication feature that is concentric with the first circular indication feature, wherein the first circular indication feature has a larger diameter than the second circular indication feature, and the first circular indication feature indicates the maximum lubricant fill level, and the second circular indication feature indicates the minimum lubricant fill level,
   wherein the transparent body is in the form of a transparent pyramidal frustum having a top and a circular indentation disposed in the top.

5. The vehicle of claim 4, wherein the first circular indication feature is located on the top and encircles the circular indentation and the second circular indication feature is located on the circular indentation.

6. The vehicle of claim 5, wherein the larger diameter of the first circular indication feature is defined by an outer perimeter of the top, which marks the transition between a side of the hubcap and the top, and a smaller diameter of the second circular indication feature is defined by a diameter of the circular indentation.

7. A hub assembly for a wheel of a vehicle, comprising:
a hubcap having a transparent body configured for housing a lubricant, a fill port, and at least one continuous indication feature such that a lubricant volume is indicated in any orientation of the hubcap, wherein the at least one continuous indication feature is in the form of a first circular indication feature and a second circular indication feature that is concentric with the first circular indication feature, and wherein the first circular indication feature has a larger diameter than the second circular indication feature, and the first circular indication feature indicates the maximum lubricant fill level, and the second circular indication feature indicates the minimum lubricant fill level, wherein the transparent body is in the form of a transparent pyramidal frustum having a top and a circular indentation disposed in the top.

8. The hub assembly of claim 7, wherein the transparent body is in the form of a six-sided transparent pyramidal frustum with a filleted, substantially circular base.

9. The hub assembly of claim 7, wherein a side of the transparent pyramidal frustum includes the fill port.

10. The hub assembly of claim 7, wherein the first circular indication feature is located on the top and encircles the circular indentation and the second circular indication feature is located on the circular indentation.

11. The hub assembly of claim 10, wherein the larger diameter of the first circular indication feature is defined by an outer perimeter of the top, which marks the transition between a side of the hubcap and the top, and a smaller diameter of the second circular indication feature is defined by a diameter of the circular indentation.

12. The hub assembly of claim 7, wherein the fill port has a bottom within the hubcap, and a diameter of the first circular indication feature corresponds to the bottom of the fill port.

\* \* \* \* \*